(12) United States Patent
Johnson et al.

(10) Patent No.: US 10,739,137 B2
(45) Date of Patent: Aug. 11, 2020

(54) SOLID STATE RING LASER GYROSCOPE USING RARE-EARTH GAIN DOPANTS IN GLASSY HOSTS

(71) Applicant: Honeywell International Inc., Morris Plains, NJ (US)

(72) Inventors: Dean E Johnson, Orono, MN (US); Jianfeng Wu, Tucson, AZ (US); Alan Bruce Touchberry, Saint Louis Park, MN (US); Teresa Marta, White Bear Lake, MN (US)

(73) Assignee: Honeywell International Inc., Morris Plains, NJ (US)

( * ) Notice: Subject to any disclaimer, the term of this patent is extended or adjusted under 35 U.S.C. 154(b) by 56 days.

(21) Appl. No.: 16/104,806

(22) Filed: Aug. 17, 2018

(65) Prior Publication Data

US 2020/0056888 A1    Feb. 20, 2020

(51) Int. Cl.
  *G01C 19/66*    (2006.01)
  *H01S 3/08*    (2006.01)
  (Continued)

(52) U.S. Cl.
  CPC ............ *G01C 19/661* (2013.01); *H01S 3/083* (2013.01); *H01S 3/08059* (2013.01);
  (Continued)

(58) Field of Classification Search
  CPC . G01C 19/661; H01S 3/08059; H01S 3/0933; H01S 3/083; H01S 3/1611;
  (Continued)

(56) References Cited

U.S. PATENT DOCUMENTS 4,222,668 A    9/1980  Henry
4,225,826 A    9/1980  Lewis et al.
(Continued)

FOREIGN PATENT DOCUMENTS

EP    1231683 A2    8/2002
GB    2432253 A    5/2007

OTHER PUBLICATIONS

U.S. Patent and Trademark Office, "Restriction Requirement", U.S. Appl. No. 16/104,773, dated Nov. 14, 2019, pp. 1-8, Published: US.
"Advanced Optics Laser Components", Advanced Optics, Feb. 2014, pp. 1-39, SCHOTT, Germany.
"Glass for Laser Applications", Advanced Optics, pp. 1-2, SCHOTT, Germany.
(Continued)

*Primary Examiner* — Hwa Andrew Lee
(74) *Attorney, Agent, or Firm* — Fogg & Powers LLC

(57) ABSTRACT

A solid state ring laser gyroscope comprises a laser block including a resonant ring cavity having an optical closed loop pathway; a plurality of mirror structures mounted on the block and including respective multilayer mirrors that reflect light beams around the closed loop pathway; and a pump laser assembly in optical communication with the closed loop pathway through one of the mirror structures. One or more of the multilayer mirrors includes a rare-earth doped gain layer operative to produce bidirectional optical amplification of counter-propagating light beams in the closed loop pathway. In some embodiments, the gain layer comprises a rare-earth dopant other than neodymium that is doped into a glassy host material comprising titania, tantalum oxide, alumina, zirconia, silicate glass, phosphate glass, tellurite glass, fluorosilicate glass, or non-oxide glass. Alternatively, the gain layer can comprise a neodymium dopant that is doped into a glassy host material other than silica.

14 Claims, 2 Drawing Sheets

(51) Int. Cl.
  *H01S 3/083*  (2006.01)
  *H01S 3/0933* (2006.01)
  *H01S 3/0941* (2006.01)
  *H01S 3/16*   (2006.01)
  *H01S 3/17*   (2006.01)

(52) U.S. Cl.
  CPC .......... *H01S 3/0933* (2013.01); *H01S 3/0941* (2013.01); *H01S 3/1611* (2013.01); *H01S 3/17* (2013.01); *H01S 3/173* (2013.01); *H01S 3/175* (2013.01); *H01S 3/176* (2013.01); *H01S 3/177* (2013.01)

(58) Field of Classification Search
  CPC .......... H01S 3/0941; H01S 3/17; H01S 3/173; H01S 3/175; H01S 3/176; H01S 3/177
  See application file for complete search history.

(56) References Cited

U.S. PATENT DOCUMENTS

| | | |
|---|---|---|
| 4,548,501 A | 10/1985 | Smith et al. |
| 4,609,267 A | 9/1986 | Deguchi et al. |
| 5,123,025 A | 6/1992 | Papuchon et al. |
| 5,319,727 A | 6/1994 | Ford et al. |
| 5,363,192 A | 11/1994 | Diels et al. |
| 5,408,492 A | 4/1995 | Vossler et al. |
| 5,513,039 A | 4/1996 | Lu et al. |
| 5,548,602 A | 8/1996 | Podgorski et al. |
| 5,574,738 A | 11/1996 | Morgan |
| 5,646,780 A | 7/1997 | Crook et al. |
| 5,843,235 A | 12/1998 | Bergman et al. |
| 5,960,022 A | 9/1999 | Halldorsson et al. |
| 5,982,802 A | 11/1999 | Thony et al. |
| 6,143,358 A | 11/2000 | Singh et al. |
| 6,256,434 B1 | 7/2001 | Matuschek et al. |
| 6,392,791 B1 | 5/2002 | Fork et al. |
| 6,685,341 B2 | 2/2004 | Ouderkirk et al. |
| 7,760,432 B2 | 7/2010 | Ramberg et al. |
| 8,379,680 B1 | 2/2013 | Sumida |
| 2001/0043636 A1 | 11/2001 | Bewley et al. |
| 2002/0097769 A1 | 7/2002 | Vetrovec |
| 2004/0052283 A1 | 3/2004 | Sutter et al. |
| 2004/0202222 A1* | 10/2004 | Pocholle ................ G01C 19/66 372/75 |
| 2005/0040337 A1 | 2/2005 | Cox et al. |
| 2007/0274361 A1 | 11/2007 | Calvez et al. |
| 2008/0212630 A1 | 9/2008 | Otake et al. |
| 2009/0027684 A1 | 1/2009 | Kitamura |
| 2011/0235047 A1 | 9/2011 | Gutty et al. |
| 2011/0274133 A1 | 11/2011 | Schober et al. |
| 2014/0044226 A1 | 2/2014 | Campbell et al. |
| 2017/0373458 A1 | 12/2017 | Podgorski |
| 2019/0245319 A1 | 8/2019 | Abeeluck |
| 2019/0324175 A1 | 10/2019 | Albers et al. |
| 2020/0056889 A1 | 2/2020 | Touchberry et al. |
| 2020/0059062 A1 | 2/2020 | Marta et al. |

OTHER PUBLICATIONS

"High-Energy Nd: YAG Laser Mirrors", Newport, May 17, 2018, pp. 1-2.
"Laser Glass", L3 Kigre, p. 1, L3 Technologies, Inc.
"Ultrafast High Reflecting Pump Mirror, 12.7 mm, 50 EFL, 710-890 nm", pp. 1-2.
George, et al. "Spectroscopy of Nd-doped laser materials", Proceedings of SPIE, Feb. 28, 2014, pp. 1-13, Publisher: SPIE, San Francisco, California.
Gerbil, et al, "Laser resonator mirror", Physics Stack Exchange, May 17, 2018, p. 1, Physics Stack Exchange.
Koechner, et al., "Solid-State Lasers: A Graduate Text", Physics and Astronomy Online Library, pp. 1-422, Springer.
Lumholt et al., "Rare Earth-Doped Integrated Glass Components: Modeling and Optimization", Journal of Lightwave Technology, Feb. 1995, pp. 1-8, vol. 13, No. 2, IEEE.
Rabeendran, "New Approaches to Gyroscopic Lasers", 2013, pp. 1-163, University of Canterbury.
Schwartz, et al., "Solid-state ring laser gyro for aerospace applications", Thales Research and Technology France, pp. 1-3, France.
Vinnins, et al., "Performance Evaluation of the Honeywell GG1308 Miniature Ring Laser Gyroscope", Communications and Navigation Section Electronics Division, pp. 1-49, Canada.
Zanotto, "Optical and mechanical properties of mature and new transparent glass—cermanics", Lamav Vitreous Materials Laboratory, Jun. 2005, pp. 1-59, IMI New Functionality in Glass, Brazil.
European Patent Office, "Partial European Search Report from EP Application No. 19191607.1", from Foreign Counterpart to U.S. Appl. No. 16/104,773, dated Feb. 21, 2020, pp. 1-13, Published: EP.
U.S. Patent and Trademark Office, "Office Action", U.S. Appl. No. 16/104,773, dated Jan. 29, 2020, pp. 1-32, Published: US.
European Patent Office, "Extended European Search Report from EP Application No. 19189929.3", from Foreign Counterpart to U.S. Appl. No. 16/104,813, dated Feb. 5, 2020, pp. 1-7, Published: EP.
Abate et al., "Active mirror: a large-aperture medium-repetition rate Nd:glass amplifier", Applied Optics, Jan. 15, 1981, pp. 351-361, Colume 20, No. 2, Optical Society of America.
European Patent Office, "Extended European Search Report from EP Application No. 19189928.5", from Foreign Counterpart to U.S. Appl. No. 16/104,806, dated Jan. 13, 2020, pp. 1-8, Published: EP.
Fink, "Types of Anti-Reflective Treatments and When to Use Them", The Photonics Solutions Updated, Jan. 30, 2009, pp. 28-31, Photonics Online.
Kartner et al., "Design and fabrication of double-chirped mirrors", Optics Letters, Jun. 1, 1997, pp. 831-833, vol. 22, No. 11, Optical Society of America.
Moghal et al., "High-Performance, Single-Layer Antireflective Optical Coatings Comprising Mesoporous Silica Nanoparticles", ACS Applied Materials and Interfaces, 2012, pp. 854-859, American Chemical Society.
U.S. Patent and Trademark Office, "Office Action", U.S. Appl. No. 16/104,813, dated Nov. 26, 2019, pp. 1-23, Published: US.
Willey, Thin-film Coatings: Understanding key design principles of antireflection coatings, LaserFocusWorld, Oct. 31, 2016, pp. 1-10.

* cited by examiner

SOLID STATE RING LASER GYROSCOPE USING RARE-EARTH GAIN DOPANTS IN GLASSY HOSTS

BACKGROUND

Ring laser gyroscopes typically include a solid block of dielectric material having a plurality of interconnected passages that are arranged in a closed loop to create a resonant cavity, with mirrors positioned at the intersection of each of the passages. In some implementations, a lasing gas is contained within the resonant cavity, and electrical potentials are applied to the lasing gas to generate counter-propagating laser beams in the resonant cavity. In other implementations, a solid state gain medium is added to one of the mirrors in the resonant cavity to generate the counter-propagating laser beams, without use of the lasing gas. For example, a few half-wavelengths of neodymium doped silica can be used to create the laser gain medium for the resonant cavity.

SUMMARY

A solid state ring laser gyroscope comprises a laser block including a resonant ring cavity having an optical closed loop pathway; a plurality of mirror structures respectively mounted on the laser block, each of the mirror structures including a respective multilayer mirror in optical communication with the optical closed loop pathway, each multilayer mirror positioned and angled to reflect light beams around the optical closed loop pathway; and a pump laser assembly in optical communication with the closed loop pathway through one of the mirror structures. One or more of the multilayer mirrors includes a rare-earth doped gain layer. The gain layer is operative to produce bidirectional optical amplification of counter-propagating light beams in the optical closed loop pathway. The pump laser assembly is configured to inject a light beam into the rare-earth doped gain layer. In some embodiments, the rare-earth doped gain layer comprises a rare-earth dopant other than neodymium that is doped into a glassy host material comprising titania, tantalum oxide, alumina, zirconia, silicate glass, phosphate glass, tellurite glass, fluorosilicate glass, or non-oxide glass. Alternatively, the rare-earth doped gain layer can comprise a neodymium dopant that is doped into a glassy host material other than silica.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is therefore not to be taken in a limiting sense.

A solid state ring laser gyroscope that uses rare-earth gain dopants in glassy hosts is disclosed herein.

As described above, neodymium (Nd) doped silica ($SiO_2$) is known to be useful in creating a laser gain medium for a resonant cavity of a solid state ring laser gyroscope. While such a laser gain medium has been well-studied, there are other active gain dopants that can be selected to accomplish the same purpose, as well as other glassy hosts for the active gain dopant.

In some embodiments, rare-earth doped active gain media besides neodymium-doped silica can be used as the solid state gain medium. In some embodiments, the gain medium can include neodymium doped into other glassy matrices besides silica, such as glassy matrices suitable for ion beam sputter deposition.

The laser gain medium can be fabricated as a thin film gain mirror, which provides bidirectional optical amplification for the beams in the resonant cavity of the ring laser gyroscope. When gain in an optical closed loop path of the resonant cavity exceeds loss, two counter propagating beams travel around the path and can be used to measure rotation.

The thin film gain mirror can be constructed by first depositing alternating layers of dielectric material onto a highly polished substrate to form a multilayer dielectric mirror. Thereafter, a single layer of a rare-earth doped glassy host material is deposited on top of the multilayer dielectric mirror to form the gain mirror. In various embodiments, the dielectric mirror can be tuned to the laser beam wavelength by making the thicknesses of the alternating layers of dielectric material equal to a quarter optical wavelength of the counter propagating laser beams. The thickness of the gain mirror can be made an integer number of half optical wavelengths of the laser light beams in order to maximize the laser light intensity inside the gain layer for maximum gain.

The rare-earth ions in the glassy host material of the gain mirror are responsible for the optical amplification of the beams. The frequencies of the beams are sensitive to rotation and the difference in the beam frequencies, which is proportional to rotation, can be measured using a beam combining optical system and detector.

The present solid state ring laser gyroscope has the benefit of eliminating wear-out mechanisms typically found in ring laser gyroscopes that contain a lasing gas in the resonant cavity, and are more cost-effective to manufacture.

Further details of various embodiments are described hereafter with reference to the drawings.

Figure 1:
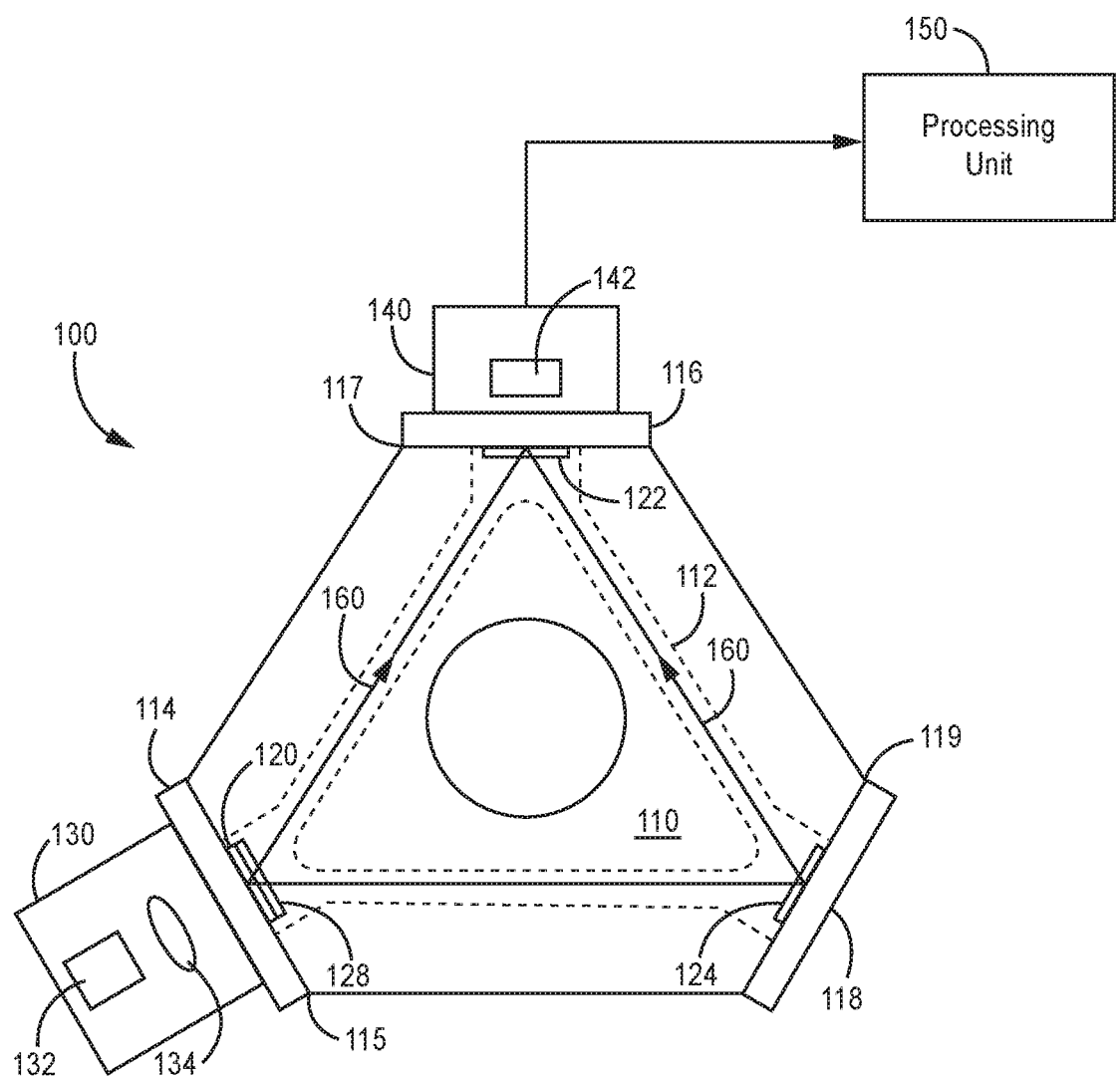
FIG. 1 is a schematic diagram of a solid state ring laser gyroscope, according to one embodiment, which can be implemented with rare-earth gain doped materials.

FIG. 1 illustrates a solid state ring laser gyroscope 100 in accordance with one embodiment, which can be implemented with rare-earth gain doped materials. The ring laser gyroscope 100 includes a laser block 110 having a resonant ring cavity in the form of an optical closed loop pathway 112, which has a substantially triangular shape. While the embodiment of FIG. 1 shows laser block 110 as triangular shaped with three blunted corners, it should be understood that this is a non-limiting example, and that other embodiments may comprise a laser block with different shapes.

A plurality of mirror structures 114, 116, and 118 are respectively mounted on laser block 110 at each of respective corners 115, 117, and 119. Each of mirror structures 114, 116, and 118 has respective highly reflective multilayer mirrors 120, 122, and 124, which are positioned and appropriately angled at the intersections of the passages in closed loop pathway 112 to reflect light from one passage into another passage. In one embodiment, multilayer mirrors 120, 122, and 124 are multilayer dielectric mirrors.

At least one of the multilayer mirrors is formed as a thin film gain mirror comprising a rare-earth doped gain medium, with the gain mirror operative to produce bidirectional optical amplification in closed loop pathway 112. For example, a rare-earth doped gain layer 128 can be formed on multilayer mirror 120 to produce the gain mirror, as shown in FIG. 1. In other embodiments, a rare-earth doped gain layer can be formed over one or more of the other multilayer mirrors structures 122, 124. The gain layer can be formed with a thin, amorphous film of rare-earth doped glassy material, which can be deposited on the multilayer mirror with convention deposition techniques. Further details of the gain mirror structure and composition are described hereafter with respect to FIG. 2.

A pump laser assembly 130, which includes a light source 132 and focusing optics 134, is in optical communication with closed loop pathway 112 through mirror structure 114. The light source 132 can include a laser diode, a light emitting diode (LED), a super luminescent LED, or an LED array, for example.

A readout device 140 including one or more photodetectors 142, is in optical communication with closed loop pathway 112 through mirror structure 116. A processing unit 150 is in operative communication with readout device 140.

When a light beam is injected into rare-earth doped gain layer 128 by pump laser assembly 130, the injected light beam needs to be emitting at a specific wavelength or wavelengths that are absorptive to gain layer 128, thus providing the excitation energy to achieve a population inversion to sustain lasing. This results in a pair of counter-propagating beams 160 within closed loop pathway 112 that travel along the same optical path by reflection from multilayer mirrors 120, 122, and 124.

Rotation of ring laser gyroscope 100 causes the effective path length for counter-propagating beams 160 to change, thus producing a frequency difference between the two beams, which can be used to determine the angular rate. For example, when optical signal information is coupled from closed loop pathway 112 to read-out device 140, an output of voltage signals is sent to processing unit 150 by read-out device 140. The difference in frequencies between counter-propagating beams 160 is determined from the voltage signals, and hence rotation information may be obtained.

Additional details not shown, regarding the physical structure and electronic circuitry associated with the laser block of the ring laser gyroscope, are considered within the knowledge of one of ordinary skill in the art and are therefore not described herein.

Figure 2:
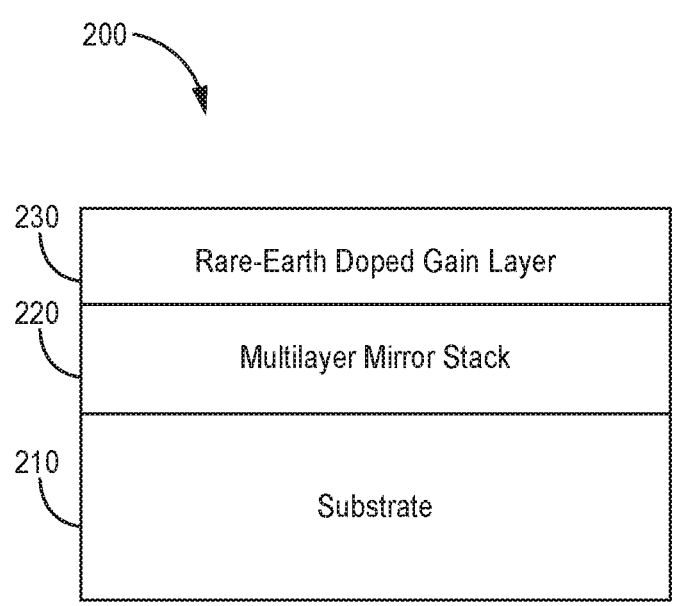
FIG. 2 is a schematic diagram of a gain mirror structure, according to one embodiment, which can be used for bidirectional optical amplification in a solid state ring laser gyroscope.

FIG. 2 illustrates a gain mirror structure 200, according to one embodiment, which can be used for bidirectional optical amplification such as in a solid state ring laser gyroscope. The gain mirror structure 200 includes a substrate 210, such as a highly polished glass substrate. A multilayer mirror stack 220, such as a high reflectivity multilayer dielectric mirror, is formed over substrate 210. The multilayer mirror stack 220 can be formed by depositing alternate layers of higher and lower index of refraction materials, each a quarter optical wavelength thick, for example. In one embodiment, alternating layers of titania ($TiO_2$) and silica can be deposited to form multilayer mirror stack 220 by standard thin film deposition techniques.

A rare-earth doped gain layer 230 is formed over multilayer mirror stack 220. The gain layer 230 can be formed by depositing a thin film of rare-earth doped glassy host material onto the outer layer of multilayer mirror stack 220. In one embodiment, gain layer 230 is formed as an integer number of half optical wavelengths thick, for example. An ion beam sputter deposition process can be employed to form gain layer 230, for example.

Non-limiting examples of suitable rare-earth dopants than can be used to form gain layer 230 include cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). Non-limiting examples of glassy host materials than can be used to form gain layer 230 include silica, titania, tantalum oxide ($Ta_2O_5$), alumina ($Al_2O_3$), zirconia ($ZrO_2$), silicate glasses, phosphate glasses, fluorosilicate glasses, non-oxide glasses such as fluoride glasses, or the like. Other glassy host materials that are suitable for ion beam sputter deposition can also be employed.

In some embodiments, neodymium is doped into other glassy host materials besides silica to form the gain layer. For example, neodymium can be doped into such other glassy host materials as titania, tantalum oxide, alumina, zirconia, silicate glasses, phosphate glasses, tellurite glasses, fluorosilicate glasses, or non-oxide glasses such as fluoride glasses.

In some other embodiments, rare-earth dopants other than neodymium are doped into glassy host materials to form the gain layer. For example, rare-earth dopants besides neodymium can be doped into titania, tantalum oxide, alumina, zirconia, silicate glasses, phosphate glasses, tellurite glasses, fluorosilicate glasses, or non-oxide glasses such as fluoride glasses.

Example Embodiments

Example 1 includes a solid state ring laser gyroscope comprising: a laser block including a resonant ring cavity having an optical closed loop pathway; a plurality of mirror structures respectively mounted on the laser block, each of the mirror structures including a respective multilayer mirror in optical communication with the optical closed loop pathway, each multilayer mirror positioned and angled to reflect light beams around the optical closed loop pathway; and a pump laser assembly in optical communication with the optical closed loop pathway through one of the mirror structures; wherein one or more of the multilayer mirrors includes a rare-earth doped gain layer, the gain layer operative to produce bidirectional optical amplification of counter-propagating light beams in the optical closed loop pathway; wherein the pump laser assembly is configured to inject a light beam into the rare-earth doped gain layer; wherein the rare-earth doped gain layer comprises: a rare-earth dopant other than neodymium that is doped into a glassy host material, wherein the glassy host material comprises titania, tantalum oxide, alumina, zirconia, silicate glass, phosphate glass, tellurite glass, fluorosilicate glass, or non-oxide glass; or a neodymium dopant that is doped into a glassy host material other than silica.

Example 2 includes the ring laser gyroscope of Example 1, wherein the rare-earth dopant comprises cerium, praseodymium, promethium, samarium, europium, gadolinium, terbium, dysprosium, holmium, erbium, thulium, ytterbium, or lutetium.

Example 3 includes the ring laser gyroscope of Example 1, wherein when the rare-earth doped gain layer comprises a neodymium dopant that is doped into a glassy host material other than silica, the glassy host material comprises titania, tantalum oxide, alumina, zirconia, silicate glass, phosphate glass, tellurite glass, fluorosilicate glass, or non-oxide glass.

Example 4 includes the ring laser gyroscope of any of Examples 1-3, wherein the multilayer mirrors comprise multilayer dielectric mirrors.

Example 5 includes the ring laser gyroscope of Example 4, wherein the multilayer dielectric mirrors comprise alternating layers of higher and lower index of refraction dielectric materials.

Example 6 includes the ring laser gyroscope of any of Examples 1-5, wherein the pump laser assembly comprises: a light source comprising a laser diode, a light emitting diode (LED), a super luminescent LED, or an LED array; and focusing optics in optical communication with the optical closed loop pathway.

Example 7 includes the ring laser gyroscope of any of Examples 1-6, wherein the light beam from the pump laser assembly has a wavelength and intensity operative to create a population inversion in the rare-earth dopant in order to produce the optical amplification.

Example 8 includes a gain mirror structure comprising: a substrate; a multilayer mirror stack over the substrate; and a rare-earth doped gain layer over the multilayer mirror stack, wherein the rare-earth doped gain layer comprises: a rare-earth dopant other than neodymium that is doped into a glassy host material, wherein the glassy host material comprises titania, tantalum oxide, alumina, zirconia, silicate glass, phosphate glass, tellurite glass, fluorosilicate glass, or non-oxide glass; or a neodymium dopant that is doped into a glassy host material other than silica; wherein the gain mirror is operative to produce bidirectional optical amplification of counter-propagating light beams in an optical closed loop pathway.

Example 9 includes the gain mirror structure of Example 8, wherein the substrate comprises a polished glass material.

Example 10 includes the gain mirror structure of any of Examples 8-9, wherein the multilayer mirror stack comprises a multilayer dielectric mirror.

Example 11 includes the gain mirror structure of Example 10, wherein the multilayer dielectric mirror comprises alternating layers of higher and lower index of refraction dielectric materials.

Example 12 includes the gain mirror structure of Example 8, wherein the rare-earth dopant comprises cerium, praseodymium, promethium, samarium, europium, gadolinium, terbium, dysprosium, holmium, erbium, thulium, ytterbium, or lutetium.

Example 13 includes the gain mirror structure of Example 8, wherein when the rare-earth doped gain layer comprises a neodymium dopant that is doped into a glassy host material other than silica, the glassy host material comprises titania, tantalum oxide, alumina, zirconia, silicate glass, phosphate glass, tellurite glass, fluorosilicate glass, or non-oxide glass.

Example 14 includes a solid state ring laser gyroscope comprising: a laser block including a resonant ring cavity having an optical closed loop pathway with a substantially triangular shape; a first mirror structure, a second mirror structure, and a third mirror structure, each of the mirror structures respectively mounted at a corner of the laser block and having a respective multilayer dielectric mirror in optical communication with the optical closed loop pathway, each multilayer dielectric mirror positioned and angled to reflect light beams around the optical closed loop pathway; a pump laser assembly in optical communication with the optical closed loop pathway through one of mirror structures; wherein one or more of the mirror structures includes a gain mirror comprising a rare-earth doped gain layer over the multilayer dielectric mirror, the gain mirror operative to produce bidirectional optical amplification of counter-propagating light beams in the optical closed loop pathway; wherein the pump laser assembly is configured to inject a light beam into the rare-earth doped gain layer; wherein the rare-earth doped gain layer comprises: a rare-earth dopant other than neodymium that is doped into a glassy host material, wherein the glassy host material comprises titania, tantalum oxide, alumina, zirconia, silicate glass, phosphate glass, tellurite glass, fluorosilicate glass, or non-oxide glass; or a neodymium dopant that is doped into a glassy host material other than silica.

Example 15 includes the ring laser gyroscope of Example 14, wherein the rare-earth dopant comprises cerium, praseodymium, promethium, samarium, europium, gadolinium, terbium, dysprosium, holmium, erbium, thulium, ytterbium, or lutetium.

Example 16 includes the ring laser gyroscope of Example 14, wherein when the rare-earth doped gain layer comprises a neodymium dopant that is doped into a glassy host material other than silica, the glassy host material comprises titania, tantalum oxide, alumina, zirconia, silicate glass, phosphate glass, tellurite glass, fluorosilicate glass, or non-oxide glass.

Example 17 includes the ring laser gyroscope of any of Examples 14-16, wherein the multilayer dielectric mirror comprises alternating layers of higher and lower index of refraction dielectric materials.

Example 18 includes the ring laser gyroscope of any of Examples 14-17, wherein the light beam from the laser assembly has a wavelength and intensity operative to create a population inversion in the rare-earth dopant in order to produce the optical amplification.

Example 19 includes the ring laser gyroscope of any of Examples 14-18, further comprising: a readout device including one or more photodetectors in optical communication with the optical closed loop pathway; wherein the readout device is operative to receive optical signal information from the optical closed loop pathway, and output voltage signals corresponding to the optical signal information.

Example 20 includes the ring laser gyroscope of Example 19, further comprising: a processing unit in operative communication with the readout device; wherein the processing unit is operative to receive the voltage signals from the readout device; wherein the processing unit is operative to determine frequency differences between the counter-propagating light beams from the voltage signals to obtain rotation information.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A solid state ring laser gyroscope, comprising:
   a laser block including a resonant ring cavity having an optical closed loop pathway;
   a plurality of mirror structures respectively mounted on the laser block, each of the mirror structures including a respective multilayer mirror in optical communication with the optical closed loop pathway, each multilayer mirror positioned and angled to reflect light beams around the optical closed loop pathway; and a pump laser assembly in optical communication with the optical closed loop pathway through one of the mirror structures;

wherein one or more of the multilayer mirrors includes a rare-earth doped gain layer, the gain layer operative to produce bidirectional optical amplification of counter-propagating light beams in the optical closed loop pathway;

wherein the pump laser assembly is configured to inject a light beam into the rare-earth doped gain layer;

wherein the rare-earth doped gain layer comprises:
a neodymium dopant that is doped into a glassy host material, the glassy host material comprising titania, tantalum oxide, alumina, zirconia, silicate glass, phosphate glass, tellurite glass, fluorosilicate glass, or non-oxide glass.

2. The ring laser gyroscope of claim 1, wherein the multilayer mirrors comprise multilayer dielectric mirrors.

3. The ring laser gyroscope of claim 2, wherein the multilayer dielectric mirrors comprise alternating layers of higher and lower index of refraction dielectric materials.

4. The ring laser gyroscope of claim 1, wherein the pump laser assembly comprises:
a light source comprising a laser diode, a light emitting diode (LED), a super luminescent LED, or an LED array; and
focusing optics in optical communication with the optical closed loop pathway.

5. The ring laser gyroscope of claim 1, wherein the light beam from the pump laser assembly has a wavelength and intensity operative to create a population inversion in the rare-earth dopant in order to produce the optical amplification.

6. A solid state ring laser gyroscope, comprising:
a laser block including a resonant ring cavity having an optical closed loop pathway with a substantially triangular shape;
a first mirror structure, a second mirror structure, and a third mirror structure, each of the mirror structures respectively mounted at a corner of the laser block and having a respective multilayer dielectric mirror in optical communication with the optical closed loop pathway, each multilayer dielectric mirror positioned and angled to reflect light beams around the optical closed loop pathway;
a pump laser assembly in optical communication with the optical closed loop pathway through one of the mirror structures;
wherein one or more of the mirror structures includes a gain mirror comprising a rare-earth doped gain layer over the multilayer dielectric mirror, the gain mirror operative to produce bidirectional optical amplification of counter-propagating light beams in the optical closed loop pathway;

wherein the pump laser assembly is configured to inject a light beam into the rare-earth doped gain layer;

wherein the rare-earth doped gain layer comprises:
a neodymium dopant that is doped into a glassy host material, the glassy host material comprising titania, tantalum oxide, alumina, zirconia, silicate glass, phosphate glass, tellurite glass, fluorosilicate glass, or non-oxide glass.

7. The ring laser gyroscope of claim 6, wherein the multilayer dielectric mirror comprises alternating layers of higher and lower index of refraction dielectric materials.

8. The ring laser gyroscope of claim 6, wherein the light beam from the laser assembly has a wavelength and intensity operative to create a population inversion in the rare-earth dopant in order to produce the optical amplification.

9. The ring laser gyroscope of claim 6, further comprising:
a readout device including one or more photodetectors in optical communication with the optical closed loop pathway;
wherein the readout device is operative to receive optical signal information from the optical closed loop pathway, and output voltage signals corresponding to the optical signal information.

10. The ring laser gyroscope of claim 9, further comprising:
a processing unit in operative communication with the readout device;
wherein the processing unit is operative to receive the voltage signals from the readout device;
wherein the processing unit is operative to determine frequency differences between the counter-propagating light beams from the voltage signals to obtain rotation information.

11. A gain mirror structure, comprising:
a substrate;
a multilayer mirror stack over the substrate; and
a rare-earth doped gain layer over the multilayer mirror stack, wherein the rare-earth doped gain layer comprises:
a neodymium dopant that is doped into a glassy host material, the glassy host material comprising titania, tantalum oxide, alumina, zirconia, silicate glass, tellurite glass, fluorosilicate glass, or non-oxide glass;
wherein the gain mirror structure is operative to produce bidirectional optical amplification of counter-propagating light beams in an optical closed loop pathway.

12. The gain mirror structure of claim 11, wherein the substrate comprises a polished glass material.

13. The gain mirror structure of claim 11, wherein the multilayer mirror stack comprises a multilayer dielectric mirror.

14. The gain mirror structure of claim 13, wherein the multilayer dielectric mirror comprises alternating layers of higher and lower index of refraction dielectric materials.

* * * * *